United States Patent
Hodges et al.

[15] 3,671,906
[45] June 20, 1972

[54] WINDING FORMERS FOR USE IN THE MANUFACTURE OF ROTOR ASSEMBLIES FOR DYNAMO ELECTRIC MACHINES

[72] Inventors: John Barry Hodges, 155, The Crescent, Walsall; Gordon Howard Maybury, 14, Ashlawn Crescent, Solihull, both of England

[22] Filed: Oct. 29, 1970
[21] Appl. No.: 85,180

[52] U.S. Cl. ............................336/208, 310/263, 242/125.1, 242/125.2
[51] Int. Cl. ............................................................H01f 27/30
[58] Field of Search ...................310/68, 263, 261; 336/198, 336/208; 242/118, 125.1, 125.2

[56] References Cited

UNITED STATES PATENTS

| 3,252,025 | 5/1966 | Brown | 310/263 |
| 3,112,898 | 12/1963 | Stahl | 336/198 |
| 3,305,740 | 2/1967 | Shano | 310/263 |
| 3,423,619 | 1/1969 | Shaw | 310/263 |
| 3,493,800 | 2/1970 | Barrett | 310/263 |

FOREIGN PATENTS OR APPLICATIONS

| 1,551,658 | 12/1968 | France | 310/263 |
| 1,468,136 | 2/1967 | France | 310/263 |
| 941,078 | 11/1963 | United Kingdom | 310/263 |

*Primary Examiner*—J. D. Miller
*Assistant Examiner*—R. Skudy
*Attorney*—Holman & Stern

[57] ABSTRACT

A winding former including a tubular, flexible cylindrical portion having an integral peripheral outwardly extending flange at each end thereof. The cylindrical portion and the flanges are formed with a split which extends the full length of the former so that the former can be compressed radially. One of the flanges has a hole through which one end of a coil wound on the former can extend in use.

3 Claims, 6 Drawing Figures

Figure 1:
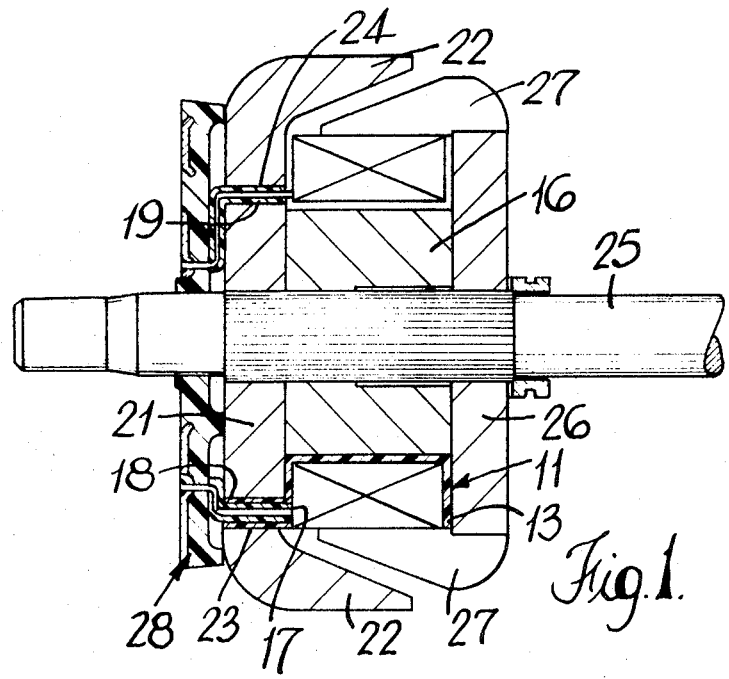

*Fig.1.*

WINDING FORMERS FOR USE IN THE MANUFACTURE OR ROTOR ASSEMBLIES FOR DYNAMO ELECTRIC MACHINES

This invention relates to winding formers for use in the manufacture of rotor assemblies for dynamo electric machines, and this application is divided from our pending U.S. patent application Ser. No. 764,841.

A winding former according to the invention includes a tubular, flexible, longitudinally split cylindrical portion having a pair of integral peripheral outwardly extending flanges at opposite ends thereof, said flanges being radially split, and one of the flanges being provided with a hole through which one end of a coil wound on the former can extend in use.

Figure 2:
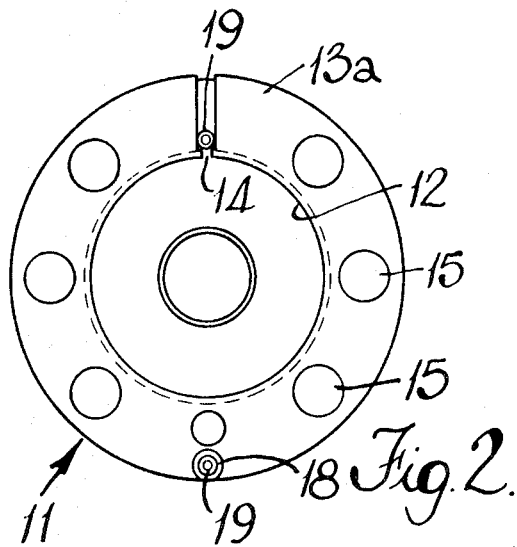
Figure 3:
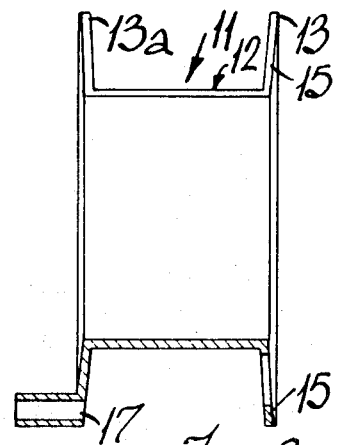
Figure 4:
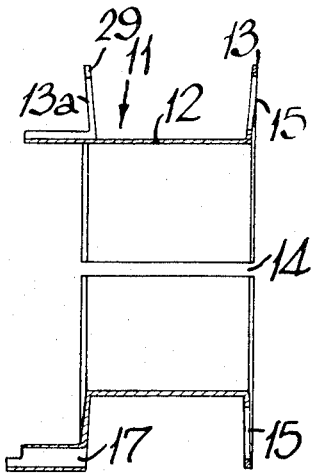
Figure 5:
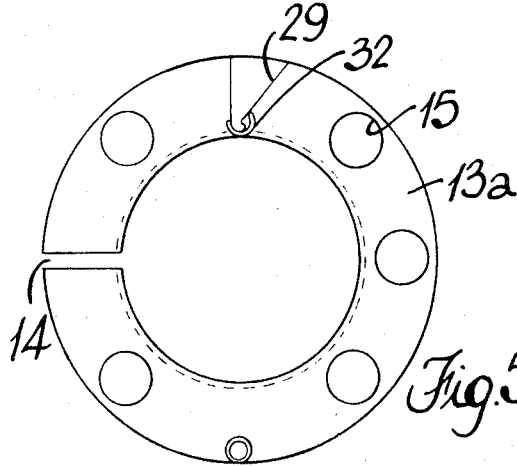
Figure 6:
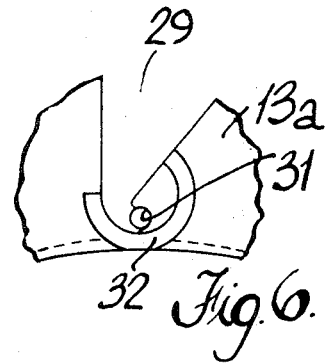

One example of the invention will now be described with reference to the accompanying drawings wherein FIG. 1 is a sectional view of a rotor assembly, FIG. 2 is an end view of the former shown in FIG. 1 with the pole, the coil and the rotor shaft omitted, FIG. 3 is a sectional view of the former shown in FIG. 1 prior to winding a coil thereon, FIG. 4 is a view similar to FIG. 3 of a modified former, FIG. 5 is an end view of the former shown in FIG. 4, and FIG. 6 is an enlarged view of part of FIG. 5.

Referring first to FIGS. 1 to 3, the former 11 is moulded in synthetic resin and includes a cylindrical portion 12 having an integral outwardly directed peripheral flange 13,13a at each axial end thereof. The portion 12 and the flanges 13,13a are formed with a split 14 which extends parallel with the longitudinal axis of the former. Both of the flanges 13,13a, are formed with a series of holes 15 and moreover the flange 13a is formed adjacent its periphery, with a hole 17 of smaller diameter than the holes 15. The hole 17 is diametrically opposite the split 14, and extending outwardly from the flange and concentric with the hole 17 is an integral tubular spigot 18. The flanges 13,13a are not at right angles to the portion 12 but extend at a small obtuse angle thereto so that the flanges diverge from one another.

In order to construct a rotor assembly for a dynamo electric machine, the former 11 is positioned on a cylindrical core piece 16, the external diameter of the core piece 16 being substantially the same as the internal diameter of the portion 12 of the former 11, and the axial length of the core piece 16 being the same as that of the portion 12. A first free end of a conductive wire is then threaded through the split 14 in the flange 13a of the former 11, so that the free end of the wire projects from the outer surface of the flange, and the core piece 16 is rotated while maintaining tension in the wire. As the core is rotated the former 11 initially tends to slip relative to the core but as the first few convolutions of the coil are wound on the former then by virtue of the tension which is maintained in the wire during winding, the former becomes compressed, as is permitted by closure of the split 14, so that the internal diameter of the portion 12 of the former 11 decreases and the former firmly grips the core.

When the coil has been wound to the correct dimension the wire is cut and the second free end thereof is threaded through the hole 17 and the spigot 18. A pair of insulating tubes 19 are then threaded onto the projecting ends of the wire and are secured to the coil using an adhesive. The core piece is then engaged with a first pole claw 21 in the form of a disc having integral fingers 22 extending from the periphery thereof at right angles thereto. The core piece 16 with its associated winding is of smaller diameter than the disc of the pole claw 21 and is positioned within the circle of the fingers 22. The spigot 18 extends through a bore 23 in the claw 21 and the first free end of the coil is threaded through a further bore 24. The assembly is then mounted as an interference fit on a rotor shaft 25 and second similar pole claw 26 is then engaged with the shaft 25 in such a manner that the fingers 27 of the claw 26 interdigitate with the fingers 22 of the claw 21, and the claw 26 is urged towards the claw 21. The axial compression of the former 11 due to the movement of the claw 26 towards the claw 21 is taken up by the flanges 13,13a which are flexed so that they lie at right angles to the portion 12 of the former. The claw 26 is then fixed relative to the shaft 25 and the rotor assembly is impregnated with varnish, the holes 15 in the flanges 13,13a of the former 11 permitting the varnish to flow into the coil. The varnish is then allowed to set whereupon it serves to physically interconnect the parts of the rotor assembly.

The free ends of the coil, encased in their respective tubes 19 and extend from the outer face of the claw 21 diametrically opposite one another, are electrically connected to a slip ring assembly 28 mounted on the shaft 25.

In the modification shown in FIGS. 4 to 6 the hole 17 and spigot 18 are not diametrically opposite the split 14 but are spaced by 90° therefrom. Diametrically opposite the hole 17, the flange 13a is formed with a V shaped slot 29, one wall of which extends parallel to a radius of the flange 13a and the other wall of which is inclined at approximately 40° to that radius. Adjacent the apex of the slot 29, the inclined wall of the slot 29 is cut away to define a notch 31 and surrounding the apex of the slot 29 and extending parallel with the spigot 18 is a trough shaped member 32, the member 32 being integral with the flange 13a.

The construction of the rotor assembly using the modified former is as described above with the exception that the first free end of the conductive wire is engaged in the notch 31 in the wall of the slot 29, so that the free end of the wire lies in the member 32, and projects from the outer face of the flange 13a. The free end of the wire is then trapped in any convenient manner while the core piece is rotated.

The provision of the notch 31 in the wall of the slot 29 prevents the first convolution of the winding from riding up the inner surface of the flange 13a as the first layer of the winding is wound onto the former. It being appreciated that such riding up of the first convolution of the winding is undesirable in that it causes a ridge to be formed in subsequent layers, as the subsequent layers are wound onto the former.

The modified former is designed for use with automatic winding machines wherein riding up of the first convolution of the coil can occur. The first described former is for use where the coils are wound manually where riding up of the first convolution of the coil can be prevented by the operator.

It will be appreciated that the axial compression of the formers, as described above, when the second pole claw is assemblied on the rotor shaft, serves to compress the radially outermost layers of the coil, since the flanges 13,13a, are moved towards one another.

Having described our invention, what we claim as new and desire to secure by Letters Patent is:

1. A winding former for use in the manufacture of a rotor assembly for a dynamo electric machine including a one piece, tubular, flexible, longitudinally split cylindrical portion having a pair of integral peripheral, outwardly extending radially split flanges at opposite ends thereof respectively, the splits in the flanges being continuous with the split of the cylindrical portion, and one of the flanges having a hole therein through which one end of a coil wound on the former can extend in use.

2. A former as claimed in claim 1 wherein the wall of said hole in said one flange is extended to define a hollow spigot projecting outwardly from the flange.

3. A former as claimed in claim 1 wherein said one flange has an open ended slot therein one wall of which extends generally radially and the other wall of which extends at an acute angle to said one wall, said other wall having a cut away portion adjacent the closed end of the slot the cut away portion defining a notch in which the first free end of the wire can be engaged at the commencement of the winding of a coil on the former, the notch serving in use to prevent the first convolution of the coil from riding up said one flange of the former.

* * * * *